United States Patent [19]

McDonnell

[11] 4,129,548

[45] Dec. 12, 1978

[54] HARDENABLE RESIN COMPOSITIONS

[75] Inventor: Christopher R. S. McDonnell, Harrogate, England

[73] Assignee: Metalife Molecular Belzona Limited, North Yorkshire, England

[21] Appl. No.: 812,755

[22] Filed: Jul. 5, 1977

[51] Int. Cl.² ............................................. C08L 63/00
[52] U.S. Cl. .............................. 260/37 M; 260/40 R; 260/42.22; 427/142
[58] Field of Search .......................... 252/62.56, 62.55; 106/304; 260/37 EP, 42.22, 37 M, 40 R; 427/142

[56] References Cited

U.S. PATENT DOCUMENTS

| 602,976 | 4/1898 | Chalmot | 423/344 |
|---|---|---|---|
| 1,274,360 | 7/1918 | Petinot | 423/344 X |
| 2,642,514 | 6/1953 | Herkenhoff | 260/37 M X |
| 2,748,099 | 5/1956 | Bruner et al. | 260/37 M |
| 3,024,711 | 3/1962 | Madison | 260/37 EP X |
| 3,328,339 | 6/1967 | Tierney | 260/37 EP |
| 3,510,443 | 5/1970 | Vandenberg et al. | 260/37 EP |
| 3,562,124 | 2/1971 | Leon et al. | 106/84 X |
| 3,884,705 | 5/1975 | Blair | 260/37 M X |

OTHER PUBLICATIONS

Dow Corning; SILANE COUPLING AGENTS; 1967; pp. 1 & 2.
Condensed Chemical Dictionary; Reinhold Publishing Corp.; 1966; p. 844.

*Primary Examiner*—Lewis T. Jacobs
*Attorney, Agent, or Firm*—Jay L. Chaskin

[57] ABSTRACT

A composition comprising a liquid polymerizable resin and an alloy of iron and silicon, known as ferrosilicon, for use as a metal repair or reclamation material. The invention also includes a two-component pack including the liquid polymerizable resin as one component and a catalyst or hardener therefor as the other component, ferrosilicon being present in one or both components.

11 Claims, No Drawings

HARDENABLE RESIN COMPOSITIONS

This invention relates to hardenable resin compositions and especially, although not exclusively to hardenable resin compositions which require a separate catalyst or hardener to be added to them in order to produce a hardened resin.

According to the present invention there is provided a composition comprising a liquid polymerizable resin and ferrosilicon.

The liquid resin is preferably a resin of one of the following types: epoxy, polyether, saturated polyester, polyol, isocyanate, polyamine, polyamide, polymercapton, silicone, unsaturated polyester, acrylate and methacrylate. More preferably the resin is an epoxy resin.

Preferably the silicon content of the ferrosilicon is from 10 to 80, preferably 10 to 20 and more preferably about 15 parts by weight per 100 parts by weight ferrosilicon.

Preferably the ferrosilicon is present in an amount of from 250 to 350 parts by weight per 100 parts by weight of resin.

Preferably the composition also includes silicon carbide in an amount of from 40 to 60 parts by weight per 250 parts by weight ferrosilicon.

Preferably the composition also contains a silane as wetting agent in an amount of from 0.5 to 1.5 parts by weight per 100 parts by weight of resin.

The present invention also provides a two component pack comprising a first component including a liquid polymerizable resin and a second component including a hardener for said resin, one or both of said first and second components also including ferrosilicon.

Two component synthetic resin based compositions are widely used as repair materials throughout industry. Applications for these products include repairs to, and rebuilding of pumps, valves, engine blocks, cylinder liners, hydraulic rams, keyways, bearing housings, castings, shutes, hoppers, shafts, machine beds, condensers, sumps, transformers and many other applications.

These synthetic resin based compositions normally consist of a base component and a solidifier component which when stored apart have a shelf life of months or even years. On mixing the two components together however in a predetermined ratio, a chemical reaction occurs in the form of polymerization yielding a product with totally different physical characteristics from the original components. This polymerization reaction varies considerably, according to the chemical nature of the components involved. The reaction time for example can be as short as several seconds for certain cycloaliphatic epoxy based compositions and as long as several days for composition involving long chain polyamide resins. Likewise, the physical properties of the end product from this polymerization can vary from hard brittle polymers to extremely flexible synthetic rubbers.

The resin types involved in formulating these compositions can be broadly classified into epoxies, polyurethanes, unsaturated polyesters, silicones and acrylics, although the present invention is not intended to be limited to any particular class of polymer or resin.

Within each classification there are numerous variations according to the individual components involved. Epoxy resin based compositions for example will always involve a molecule containing more than one $\alpha$ epoxy group (whether situated internally, terminally, or on cyclic structures). The solidifier component can vary however from simple amines such as diethylene triamine to complex polymercaptons. Similar variations can be described for polyurethanes, unsaturated polyesters, silicones and acrylics. With each type however two components are involved to produce the end polymer.

Mixing these components together will produce a polymer with physical properties such as adhesion, hardness, flexural strength, impact resistance, compressive strength, heat resistance, abrasion resistance, etc. The individual components possess none of these properties and could not be considered as repair compounds in the meaning of this particular patent. The resultant polymer however, after mixing, possesses all the above properties to varying degrees. The individual properties can be varied according to the nature and the type of resin employed. For example from epoxy resin based compositions cured with amine solidifiers, polymers with outstanding hardness and compressive strength can be produced. The same epoxy resin based composition cured with a polyamide solidifier can produce a polymer with outstanding adhesion characteristics. By careful selection of base and solidifier components, polymers with outstanding adhesion, impact resistance, flexibility, flexural strength, etc., can be produced.

In addition to variations in the type of resins used the components discussed in this patent application can be reinforced with numerous fillers. Fillers such as asbestine, talc and china clay can be incorporated to improve adhesion. Asbestos and fibrous type fillers give improved impact resistance, whereas metallic fillers give rise to improved abrasion resistance and with careful selection of the filler involved a metallic filler can impart certain metallic characteristics to the polymer.

The vast majority of applications for two component resin based repair compounds involves the repair and reclamation of iron and steel based machinery and equipment, where erosion, corrosion and abrasion play a major part in the breakdown and failure of this equipment throughout industry. Erosion in the form of abrasion and corrosion causes premature failure of pumps, valves, liners, bearings etc. Repair of these breakdowns with the two component compositions discussed above is well known and widely practised. The abrasion resistance of these compositions is extremely limited however, and for this reason iron powder is widely used as a filler for these resin based compounds. The use of iron powder at high levels produces a polymer with many characteristics of the parent metal. These compositions are strongly magnetic and can be drilled, tapped and machined like conventional metal. In addition the abrasion resistance of iron filled polymers is considerably better than the same polymer without this metallic filler.

The same powder however does have a number of drawbacks which must obviously be weighed against the above advantages when formulating a metal repair composition. In particular, polymers filled with a high level of iron powder will rust very readily when exposed to the atmosphere and the following example (Example I) illustrates this.

The liquid resin from the reaction process between 2.2 bis (4 hydroxyphenol) propane and epichlorohydrin was blended with 100 mesh iron powder in the ratio 100 parts liquid resin and 300 parts iron powder by weight. The addition of 50 parts by weight of a liquid amidopolyamine resin gave a composition which polymerized over a period of 24 hours. The resultant polymer was exposed in the ASTM B117 Salt Spray and showed considerable rusting after only 50 hours exposure.

On natural exposure in an industrial environment the same composition shows a similar degree of corrosion after only 2 weeks' exposure.

The use of iron powder in a two component synthetic resin based composition will also lower the chemical resistance of the resultant polymer. Metallic iron is readily attacked by a wide variety of industrial chemicals including many acids and alkalis.

Iron filled polymers as metal repair compositions therefore exhibit most of the disadvantages of the component they are repairing. Whilst this does not preclude their use as general purpose repair compositions it does mean that the repair has a limited life. The abrasion and corrosion found in pumps for example will continue to attack the repaired area and frequent recoating will be necessary.

Metals other than iron powder have been used as fillers in these polymers but invariably the use of alternative metals can lead to numerous side effects such as low abrasion resistance, bimetallic corrosion, machining difficulties and storage problems. Iron powder presents none of the above problems and of course produces a composition with similar characteristics to the repaired surface.

Work on alternative powders to iron has led to the examination of a unique alloy of iron and silicon under the name of ferrosilicon. This alloy is produced in electric arc furnaces by melting suitable mixtures of iron filings or oxides with crystal silica-quartz, quartzite and coke. The resultant ferrosilicon is then broken down in two ways.

a. By grinding — The fluid ferrosilicon is allowed to cool and then broken up, ground and sieved until the required fineness is achieved.

b. By atomizing — This involves atomising the liquid ferrosilicon with air or steam. The fine powder created is then quenched in water, dried and sieved to the required fineness.

These two different processing methods produce powders with different characteristics. The powders produced by the atomised process are generally spherical in shape, with the surface of the individual grains passivated by a thin oxide layer. This results in a powder with outstanding corrosion resistance.

Granular ferrosilicon however has a comparatively rough surface and the sharp corners and edges of this powder can give rise to corrosion under aggressive conditions.

Both powders are available in fine and coarse grades.

The silicon content of the ferrosilicon alloy can be varied according to the levels of iron and quartz used in the manufacturing process. In practice 15%, 45% and 75% silicon levels are used and the conventional outlets for these alloys are as follows:

Heavy media separation — 15% ferrosilicon is widely used for treating iron, manganese, chromium, lead and zinc ores with separation occuring into waste material and preconcentrate.

Electrode coatings — in coating electrodes, silicon is used as a reducing agent, to bring the silicon content into the weld. Ferrosilicon (with 45% silicon) is widely used as the silicon carrier in these coatings.

As an alloying material — with this end application ferrosilicon with silicon contents as high as 75% is used as an alloying material in steel mills and foundries.

These end applications, particularly the heavy media separation process, call for a powder with high corrosion resistance and ferrosilicon meets this requirement. This property of corrosion resistance together with the fact that ferrosilicon exhibits many of the properties of iron powder, — the powder is magnetic and can be machined, tapped and drilled in a similar manner to iron, led to an investigation into the suitability of this alloy as a replacement for iron powder in two component metal repair components.

The initial investigation consisted of the following work. The liquid resin from the reaction between 2.2 bis (4 hydroxyphenol) propane and epichlorohydrin was blended with 100 mesh ferrosilicon in the ratio 100 parts resin to 300 parts ferrosilicon by weight (Example II). The atomized grade of ferrosilicon containing 15% silicon being used. The addition of 50 parts by weight of a liquid amidopolyamine to this composition gave a product which polymerized in 24 hours at 20° C. Exposure of the resultant polymer in the ASTM B117 Salt Spray showed no evidence of corrosion after 50 hours.

This work was carried out to determine the viability of ferrosilicon as a replacement for iron powder in resin based compositions. The following example takes this work one stage further.

In this example (Example III) the liquid resin from the reaction between 2.2 bis (4 hydroxyphenol) propane and epichlorohydrin was blended with atomized ferrosilicon (15% silicon) in the ratio 100 parts liquid resin to 300 parts ferrosilicon by weight. To this composition 3.0 parts by weight of coagulated silicon dioxide from the flame hydrolysis of silicon tetrachloride were added. This addition gave the composition a degree of thixotropy and produced a more stable blend of resin and ferrosilicon. An addition of 20 parts by weight of an acid metasilicate of magnesium improved this thixotropy still further and produced a composition (Example III) with excellent storage stability. The addition of 50 parts by weight of a liquid amidopolyamine resin to the above material gave a composition which polymerized in 24 hours at 20° C. The resultant polymer was exposed in the ASTM B117 Salt Spray, the BS 3900 Salt Spray, the BS 3900 Humidity Cabinet and on natural exposure at Harrogate. After 4,000 hours exposure in the above environments there was no sign of corrosion on any of the test pieces.

Machining tests on solid rods of the polymerized composition given in Example III showed the material could be drilled, tapped and machined like conventional steel. In addition the material was strongly magnetic and had excellent abrasion resistance. The following work compared the abrasion resistance of Examples I, II and III. Mild steel panels coated with all three examples given were tested on the Taber abrasion tester (manufactured by Taledyne Taber, New York). The Calibrade H10 wheels were used in this test and a 500 gram loading was applied.

After 500 cycles under the above conditions the following weight losses were recorded.

Composition in Example I — 0.1350 grams
Composition in Example II — 0.0750 grams
Composition in Example III — 0.0770 grams The above results clearly show the superior abrasion resistance of Compositions II and III based on 15% ferrosilicon.

Chemical resistance tests carried out on Compositions I and II in dilute acids, dilute alkalis and inorganic salt solutions (10% solutions) over a period of 6 months showed that the ferrosilicon based composition had considerably better chemical resistance and showed no signs of corrosion after 6 months immersion, whereas the composition (Example I) based on iron powder had been attacked in every environment.

All the above examples I, II and III polymerized slowly at 20° C and the object of the work carried out with these compositions was to examine the advantages of ferrosilicon over iron powder based compositions. In the following example (Example IV) a composition with an improved rate of polymerization was evaluated. In this example the liquid resin from the reaction between 2.2 bis (4 hydroxyphenol) propane and epichlorohydrin was blended with atomised ferrosilicon (15% silicon) in the ratio 100 parts resin to 300 parts ferrosilicon. 3.0 parts by weight of coagulated silicon dioxide and 20.0 parts by weight of an acid metasilicate of magnesium were added to produce a thixatropic composition.

The addition of 90 parts by weight of mercapton terminatd liquid polymer and 10 parts by weight of tris 2-4-6 dimethylaminomethyl phenol gave a composition which polymerized rapidly at room temperature and which was relatively hard after 20 minutes reaction.

A comparison between this composition (Example IV) and a composition where the 300 parts of 100 mesh ferrosilicon were replaced weight for weight with iron powder (Example V) gave the following results. After 100 hours exposure in the ASTM B117 Salt Spray the ferrosilicon based composition (Example IV) was completely rust free whereas the iron based composition (Example V) showed considerable rusting and corrosion.

A further composition (Example VI) with an improved rate of polymerization was examined as follows. The liquid resin from the reaction between 2.2 bis (4 hydroxyphenol) propane and epichlorohydrin was blended with atomized ferrosilicon (15% silicon) in the ratio 100 parts resin to 300 parts ferrosilicon. 3.0 parts coagulated silicon dioxide and 20.0 parts of an acid metasilicate of magnesium were added to the above blend to produce a thixotropic composition (Example VI). This composition was polymerized by the addition of 25 parts of a liquid activated aromatic polyamine. The resultant polymer was hard after 1 hour at room temperature and on exposure in the ASTM B117 Salt Spray showed no sign of corrosion after 500 hours exposure.

Storage tests on the unpolymerized composition (Example VI) however showed that after prolonged storage at 20° C this formulation tended to stiffen and eventually crystallize. The following work was carried out in examining a composition which was completely stable at 20° C even after prolonged periods of storage.

The reaction product from 2.2 bis (4 hydroxyphenol) propane and epichlorohydrin was blended with 100 mesh atomized ferrosilicon (15% silicon) in the ratio 80 parts resin to 300 parts ferrosilicon. 20 parts of an epoxylated phenol formaldehyde resin were added to this composition followed by 3.0 parts coagulated silicon dioxide and 20.0 parts of an acid metasilicate of magnesium. This composition (Example VII) showed excellent storage stability with no stiffening or crystallization even after prolonged storage.

Polymerization of this composition with 25 parts of a liquid activated aromatic polyamine produced a polymer which showed no sign of corrosion after 1,000 hours ASTM B117 Salt Spray.

Further examination of ferrosilicon based compositions led to an investigation into the abrasion resistance of polymers containing ferrosilicon in combination with abrasion resistant fillers. In particular fillers such as quartz flour, aluminum oxide and silicon carbide were examined in combination with 15% atomized ferrosilicon. This work indicated that combinations of ferrosilicon and silicon carbide produced polymers with outstanding abrasion resistance while still retaining many of the advantages of polymers based on ferrosilicon alone.

In Example VIII the liquid resin from the reaction product between 2.2 bis (4 hydroxyphenol) propane and epichlorohydrin was blended with 100 mesh atomized ferrosilicon in the ratio 100 parts resin to 250 parts ferrosilicon by weight. 50 parts by weight of 150 mesh silicon carbide were added to this blend followed by 3.0 parts coagulated silicon dioxide and 20.0 parts of an acid metasilicate of magnesium.

The resulting composition was polymerized with 25 parts of a liquid activated aromatic amine to produce a polymer with outstanding abrasion resistance.

Tests carried out on the Taber Abrasion Tester using Calibrade H10 Wheels and a 500 gm loading gave the following results.
Composition as given in Example III 0.0770 grams
Composition as given in Example VIII 0.0160 grams The above figures are expressed as weight of polymer removed after 500 cycles and clearly show the superior abrasion resistance of the polymer given in Example VIII. This polymer still exhibited many of the advantages of earlier examples, in that the material was strongly magnetic and could be drilled and tapped like conventional metal. The machining characteristics of this polymer were inferior to Examples II to VII however. The presence of silicon carbide producing excessive wear on any tool tips used in the machining process.

In addition to the above work on abrasion resistant fillers a wide range of adhesion promoters were evaluated in ferrosilicon based compositions. This work showed that monomeric organo-functional silicon compounds produced a marked improvement in the adhesion of ferrosilicon based polymers to both metal and mineral substrates.

In Example IX the liquid resin from the reaction between 2.2 bis (4 hydroxyphenol) propane and epichlorohydrin was blended with 100 mesh atomized ferrosilicon in the ratio 100 parts resin to 300 parts ferrosilicon. 3.0 parts coagulated silicon dioxide and 20.0 parts by weight of an acid metasilicate of magnesium were added to the above blend followed by 1.0 parts of gamma glycidoxypropyltrimethoxyoilane.

The above composition (Example IX) was polymerized using 25.0 parts of a liquid activated aromatic polyamine produced a polymer with outstanding adhesion to metal surfaces.

In adhesion tests carried out according to ASTM D1002-53T the polymerized composition given in Example IX was compared with the polymerized composition given in Example III. Bonded steel specimens coated with both compositions give the following results at 20° C.
Adhesion to steel of polymer from Example III — 2,200 psi.
Adhesion to steel of polymer from Example IX — 2,500 psi.

In addition to the above results the polymer containing the organo-functional silane (Example IX) gave improved adhesion results on oily and on wet steel substrates. The following figures illustrate these improved results, again the tests were carried out according to ASTM D1002-53T.

The contaminated steel substrates were obtained by dipping the steel test pieces in mineral oil and water respectively at 20° C and allowing the test piece to stand for 30 minutes prior to the application of the polymer under test.

Adhesion to oily steel of Polymer from Example III — 1,140 psi

Adhesion to oily steel of Polymer from Example IX — 1,860 psi

Adhesion to wet steel of Polymer from Example III — 760 psi

Adhesion to wet steel of Polymer from Example IX — 1,280 psi

The work outlined in Example I to IX has involved the evaluation of atomized ferrosilicon in a liquid resin from the reaction between 2.2 bis (4 hydroxyphenol) propane and epichlorohydrin. In Examples X and XI the use of ferrosilicon in alternative polymer compositions was investigated. In Example X 100 parts of a liquid branched polyalcohol with a hydroxyl content of 5% were blended with 300 parts of 100 mesh atomized ferrosilicon. 3.0 parts coagulated silicon dioxide and 20.0 parts of an acid metasilicate of magnesium were added to the above blend followed by 10.0 parts of a crystalline aluminosilicate with a cavity diameter of 11.4A. This composition (Example X) was polymerized by the addition of 40 parts of diphenyl methane 4-4 diisocyanate. The resulting polymer was exposed in the ASTM B117 Salt Spray and showed no sign of corrosion after 500 hours exposure. The formulation was strongly magnetic and could be machined, tapped and drilled with ease. Comparison between this composition and a similar composition based on iron powder showed almost identical machining properties. The latter material showed considerable corrosion in the ASTM B117 Salt Spray after only 100 hours exposure however.

In Example XI an unsaturated polyester resin containing 35% styrene by weight was blended with 100 mesh atomized ferrosilicon (15% silicon) in the ratio 100 parts resin to 300 parts ferrosilicon by weight. 3.0 parts coagulated silicon dioxide and 20.0 parts of an acid metasilicate of magnesium were added to this blend to produce a thixotropic composition (Example XI). The addition of 10.0 parts of a 50% dispersion of benzoyl peroxide in dibutyl phthalate plasticizer gave rise to rapid polymerization and a hard polymer was produced within 20 minutes of the peroxide addition. This polymer was exposed in the ASTM B117 Salt Spray and showed no signs of corrosion after 500 hours exposure. A similar composition on iron powder showed extensive corrosion in the same test after only 100 hours exposure.

The polymer from Example XI was strongly magnetic and could be machined, drilled and tapped like conventional metal. In addition the storage stability of this composition was considerably better than that of a similar composition based on iron powder. After b months storage at 20° C the Base component was still in good condition whereas it is a known fact that unsaturated polyester resins blended with iron powder have a limited storage life of 1 - 2 months. This improved storage stability is obviously due to the reduced reactivity and passivation of the ferrosilicon powder after the atomization process.

All the above work has been based on the atomized ferrosilicon powder containing 15% silicon and in the following examples the relative merits of 15%, 45%, and 75% silicon contents in ferrosilicon are examined.

The liquid resin from the reaction between 2.2 bis (4 hydroxyphenol) propane and epichlorohydrin was blended with an acid metasilicate of magnesium in the ratio 100 parts resin to 20 parts metasilicate by weight. 3.0 parts of coagulated silicon dioxide were added to the above blend to produce a semi thixotropic composition.

From this basic composition three polymers with varying silicon contents were produced:

The addition of 300 parts of 75% atomized ferrosilicon and 25 parts by weight of activated aromatic polyamine produced a polymer (Example XII) with a low silicon content.

The addition of 300 parts of 45% atomized ferrosilicon and 25 parts by weight of activated aromatic polyamine produced a polymer (Example XIII) with a medium silicon content.

The addition of 300 parts of 75% atomized ferrosilicon and 25 parts by weight of activated aromatic polyamine produced a polymer (Example XIV) with a high silicon content.

Examination of the above Polymers (Examples XII, XIII and XIV) in the ASTM B117 Salt Spray showed no evidence of corrosion after 1,000 hours exposure.

The composition in Example XII (15% silicon) was strongly magnetic whereas Example XIII (45% silicon) was only weakly magnetic and Example XIV (75% silicon) showed no evidence of magnetism.

Furthermore the compositions given in Examples XIII and XIV were dry and difficult to mix, particularly Example XIV. For a practical formulation the level of ferrosilicon would have to be reduced.

The abrasion resistance of all three formulations was of a similar order and was consistantly higher than the abrasion resistance of a composition based on iron powder as in Example I.

A comparison between the relative merits of atomized and granular ferrosilicon is given in the following examples.

The liquid resin from the reaction between 2.2 bis (4 hydroxyphenol) propane and epichlorohydrin was mixed with 100 mesh atomized ferrosilicon (15% silicon) in the ratio 100 parts resin to 300 parts ferrosilicon by weight. 3.0 parts of coagulated silicon dioxide and 20.0 parts of an acid metasilicate of magnesium were added to the above blend to produce a thixotropic composition (Example XV). The composition was polymerized by the addition of 25 parts of a liquid activated aromatic amine. This polymer was compared with a similar composition where the atomized ferrosilicon was replaced on a weight for weight basis with 100 mesh angular ferrosilicon (15% silicon). Exposure of the two materials in the ASTM B117 Salt Spray, the BS 3900 Salt Spray and the BS 3900 Humidity Cabinet for 1,000 hours showed no evidence of corrosion with either composition although very slight rust staining was observed with the angular ferrosilicon based composition.

Abrasion resistance tests and machining tests gave identical results for both formulations.

From these results it can be seen that both angular and granular ferrosilicon show considerable advantages over iron powder in two component metal repair compositions. Both alloys display outstanding corrosion and abrasion resistance and produce compositions which can be drilled, tapped and machined like conventional metal.

The level of silicon in the ferrosilicon alloy can be varied considerably although optimum results are obtained with a composition based on 15% silicon, 85% iron.

I claim:

1. A method of repairing metal parts comprising replacing worn or damaged portions of metal in said parts with a composition comprising a liquid polymerizable resin, ferrosilicon, and a hardener for said resin.

2. A method according to claim 1 wherein the liquid resin includes an epoxy resin.

3. A method according to claim 1 wherein the liquid resin includes at least one resin selected from the group consisting of a saturated polyester, a polyurethane, a polyamine, a polyamide, a polymercapton, a silicone, an unsaturated polyester, an acrylate and a methacrylate.

4. A method according to claim 1 herein the ferrosilicon is an angular or spherical powder or a blend of both.

5. A method according to claim 1 wherein the silicon content of the ferrosilicon is from 10 to 80 parts by weight per 100 parts by weight ferrosilicon.

6. A method according to claim 1 wherein the silicon content of the ferrosilicon is from 10 to 20 parts by weight per 100 parts by weight ferrosilicon.

7. A method according to claim 1 wherein the silicon content of the ferrosilicon is about 15 parts by weight per 100 parts by weight ferrosilicon.

8. A method according to claim 1 wherein the ferrosilicon is present in an amount of from 250 to 350 parts by weight of resin.

9. A method according to claim 1 wherein the composition also includes silicon carbide in an amount of from 40 to 60 parts by weight per 250 parts by weight ferrosilicon.

10. A composition according to claim 1 wherein the composition also includes a silane as wetting agent, present in an amount of from 0.5 to 1.5 parts by weight per 100 parts by weight of resin.

11. A method according to claim 1 wherein said composition is obtained by mixing the two components of a two component pack comprising a first component including said liquid polymerizable resin and a second component including said hardener for said liquid polymerizable resin, one or both of said first and second components also including ferrosilicon.

* * * * *